(No Model.)

F. I. MAULE.
PIPE COUPLING.

No. 340,801. Patented Apr. 27, 1886.

Witnesses:
James F. Tobin
Hey. Barkoff

Inventor:
Francis I. Maule
by his Attorneys
Howson and Sons

UNITED STATES PATENT OFFICE.

FRANCIS I. MAULE, OF PHILADELPHIA, PENNSYLVANIA.

PIPE-COUPLING.

SPECIFICATION forming part of Letters Patent No. 340,801, dated April 27, 1886.

Application filed September 29, 1884. Serial No. 144,251. (No model.)

*To all whom it may concern:*

Be it known that I, FRANCIS I. MAULE, a citizen of the United States, and a resident of Philadelphia, Pennsylvania, have invented certain Improvements in Pipe-Couplings, of which the following is a specification.

My invention relates to that class of couplings in which packings of soft metal or alloy are used, the object of my invention being to provide for the proper seating of one part of the coupling upon the other.

Figure 1:
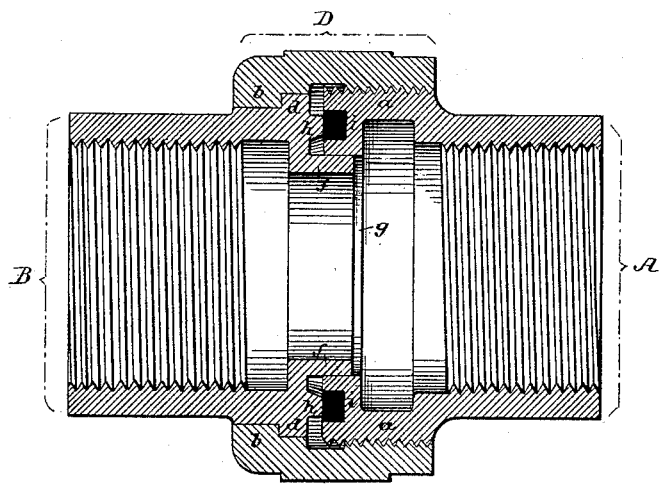
Figure 2:
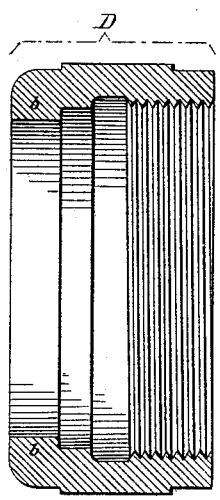
Figure 3:
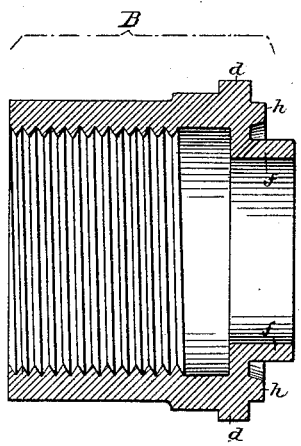
Figure 4:
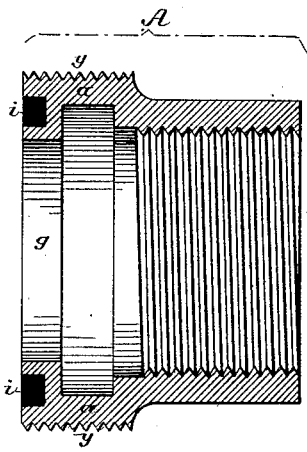

In the accompanying drawings, Figure 1 is a sectional view of my improved coupling, and Figs. 2, 3, and 4 views of the parts of the coupling detached from each other.

The complete coupling shown in Fig. 1 consists of the two sockets A and B and coupling-ring D, each socket being threaded internally to receive the threaded end of the pipe, and the portion $a$ of the socket A being threaded externally at $y$ and adapted to the internally-threaded part of the coupling-ring D. An internal shoulder, $b$, in this ring bears against a collar, $d$, on the socket B, the latter having at one end an annular tongue, $f$, which fits snugly into the opening $g$ in the end of the socket A, so that the concentricity of the two sockets, one with the other, is assured. An annular rib, $h$, on the socket B, bears against a bed, $i$, of lead or appropriate alloy secured in an annular groove in the face of the socket A, the coupling-ring serving to force the rib against the soft metal and thereby effect a tight joint between the couplings. All of the finished parts of the two sockets and the coupling-ring being made true in respect to each other, the result must be the accurate fitting of the faced end of the annular rib $h$ of the socket B against the faced bed of lead or alloy in the socket A.

I am aware that it is not new to provide one section of a pipe-coupling with a groove to receive a packing-ring forming a seat for a rib on the other section of the coupling, and hence do not broadly claim such construction, but the projecting tongue $f$, fitting snugly to the bore of the portion A of the coupling, performs an important duty in insuring the concentricity of the rib $h$ with, and the proper bearing of said rib upon, the soft metal bed, for as said bed is flush with the face of the coupling the rib $h$ can have no influence in properly centering itself, as in those couplings in which the packing-ring is at the base of a deep groove.

I therefore claim as my invention—

The combination of the section A of the coupling having an annular bed of soft metal or alloy, the face of which is flush with that of the coupling, with the section B, having an annular rib bearing on said bed and an annular tongue which fits the central bore of the section A, as set forth.

In testimony whereof I have signed my name to this specification in the presence of two subscribing witnesses.

FRANCIS I. MAULE.

Witnesses:
  JOHN M. CLAYTON,
  HARRY SMITH.